United States Patent Office 3,637,704
Patented Jan. 25, 1972

3,637,704
1γ-(p-FLUOROBENZOYL)PROPYL-4-PHENYLALKYL PIPERAZINE
Susumu Umemoto, Sakai-shi, Yasutaka Nagai, Kyoto-fu, and Keiji Nakamura, Neyakawa-shi, Japan, assignors to Dainippon Pharmaceutical Co., Ltd., Higashi-ku, Osaka, Japan
No Drawing. Filed Apr. 23, 1968, Ser. No. 723,581
Claims priority, application Japan, Oct. 18, 1967, 42/67,137, 42/67,138; Oct. 19, 1967, 42/67,364
Int. Cl. C07d 51/70
U.S. Cl. 260—268 R   14 Claims

ABSTRACT OF THE DISCLOSURE

Novel 1-aroylpropyl-4-aralkyl piperazines and pharmaceutically acceptable non-toxic salts thereof which are useful as the psychotropic agents, and to compositions for psychotropic agents which comprise as an active component a 1-aroylpropyl-4-aralkyl piperazine or a pharmaceutically acceptable non-toxic salt thereof.

---

This invention relates to novel 1-aroylpropyl-4-aralkyl piperazines and pharmaceutically acceptable non-toxic salts thereof which are useful as the psychotropic agents, and to compositions for psychotropic agents which comprise as an active component a 1-aroylpropyl-4-aralkyl piperazine or a pharmaceutically acceptable non-toxic salt thereof.

1-aroylpropyl-4-aralkyl piperazines of this invention are represented by the formula:

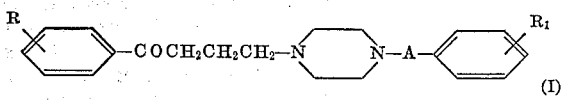

wherein R stands for hydrogen, halogen (e.g. fluorine atom) or a lower alkoxy group having 1 to 4 carbon atoms (e.g. methoxy group); $R_1$ stands for hydrogen, halogen (e.g. chlorine, bromine and fluorine atoms), nitro, hydroxyl, a trihalogenomethyl group (e.g. trifluoromethyl group), a lower alkanoyl group having 2 to 5 carbon atoms (e.g. acetyl and propionyl groups), an aroyloxy group in which the aryl is a monocyclic aryl group (e.g. benzoyloxy group), a lower alkyl group having 1 to 4 carbon atoms (e.g. methyl and ethyl groups), a lower alkylthio group having 1 to 4 carbon atoms (e.g. methylthio and ethylthio groups) or a lower alkoxy group having 1 to 4 carbon atoms (e.g. methoxy and ethoxy groups); and A stands for a lower alkylene group having 1 to 5 carbon atoms (e.g. methylene, ethylene and propylene groups) which may be substituted by a lower alkyl group having 1 to 4 carbon atoms (e.g. methyl and ethyl groups) or by a monocyclic aryl group (e.g. phenyl group).

As preferred 1-aroylpropyl-4-aralkyl piperazines the following are cited:

1-[γ-(p-fluorobenzoyl)-propyl] - 4 - (p-methoxybenzyl)-piperazine,

1-[γ-(p-fluorobenzoyl)-propyl] - 4 - (p-fluorobenzyl)-piperazine,

1-[γ-(p-fluorobenzoyl)-propyl] - 4 - (p-methylbenzyl)-piperazine,

1-[γ-(p-fluorobenzoyl)-propyl] - 4 - (p-methylthiobenzyl)-piperazine, and

1-[γ-(p-fluorobenzoyl)-propyl] - 4 - (m-chlorobenzyl)-piperazine.

It has been found that when compared with the known 1-aroylpropyl-4-aryl piperazines of U.S. Pat. 2,997,472, the novel piperazines and their salts of this invention have an excellent catalepic activity which is a pharmacologically psychotropic activity and have a decreased muscle relaxant activity which is a clinically undesirable side effect (ataxia or relaxation of limbs); and it has been also found that the novel piperazines and their salts of this invention, when compared with the known 1-aroylpropyl-4-piperonyl piperazines of French Pat. No. 1,485,246, have a similar cataleptic activity and have a reduced muscle relaxant activity.

Still further, it has been found that the novel piperazines of this invention have other activities which are desirable for a pharmacologically effective remedy for schizophrenia, such as, lowering body temperature, prevention of methamphetaine-induced locomotor activity (photo-cell cage performance), potentiation of barbituate-induced sleep, anti-histamine effect, etc.; and it has also been found that the novel piperazines of this invention exhibit a very strong activity for the inhibiting of various conditioned reflexes (e.g. conditioned avoidance reflex and conditioned water-reward reflex), which is necessary for a remedy for schizophrenia.

The pharmaceutically acceptable non-toxic salt of the piperazines of this invention includes salts of inorganic acids such as sulfuric acid, phosphoric acid, hydrochloric acid and hydrobromic acid; salts of organic acids such as citric acid, lactic acid, maleic acid, malic acid, tartaric acid, acetic acid and benzoic acid; and quaternary ammonium salts with hydrocarbon halogenides such as methyl chloride, methyl bromide, ethyl chloride, ethyl bromide, benzyl chloride, benzyl bromide, phenyl chloride, phenyl bromide, allyl chloride and allyl bromide.

Pharmacological activities of some of the compounds of this invention and some of the known compounds are shown in the following tables. Compounds (A), (B), (C) and (D) appearing in the tables are the piperazines of this invention, the compound (A) representing 1-[γ-(p-fluorobenzoyl)propyl]-4-(p - methoxybenzyl) piperazine, the compound (B) 1-[γ-(p-fluorobenzoyl)-propyl]-4-(p-fluorobenzyl) piperazine, the compound (C) 1-[γ-(p-fluorobenzoyl) - propyl] - 4 - (p-methylbenzyl) piperazine and the compound (D) 1-[γ-(p-fluorobenzoyl)-propyl]-4-(p-methylthiobenzyl) piperazine. The compound (a) in the tables is 1-[γ-(p - fluorobenzoyl)-propyl]-4-(o-methoxyphenyl) piperazine disclosed in the above-mentioned U.S. patent and the compound (b) is 1-[γ-(p-fluorobenzoyl)-propyl] - 4 - (piperonyl)-piperazine disclosed in the above-mentioned French patent.

Male dd-mice and male Wistar rats were subjected to experiments conducted to measure the activities of these compounds except following experiment 5.

(1) Cataleptic activity

The experiments were conducted in accordance with the following procedures:

Each of the compounds was intraperitoneally administered to a group of 5 mice and the cataleptic state appearing on the mice was measured at 30 minutes, 60 minutes, 120 minutes, 180 minutes and 24 hours respectivey, and based on the point when the peak effect was attained, the dose-response curve was prepared in respect of each compound and the $ED_{50}$ value was calculated in accordance with Litchfield-Wilcoxon method.

The results are shown in Table I below:

TABLE I

| Compound: | Mice $ED_{50}$ (mg./kg.) |
|---|---|
| (A) | 14.0 |
| (B) | 23.0 |
| (a) | 66.0 |
| (b) | 11.5 |

(2) Muscle relaxant activity

The experiments were conducted in accordance with the following procedures:

In case mice.—After each compound has been intraperitoneally administered to a group of 5 mice, these mice were separately put into a cylindrical wire-cage having a diameter of 21 cm. and a length of 60 cm. and rotating at a rate of 2 rotations per minute in the state where the wire-cage slants 60° to the horizontal direction. Based on the number of the mice which failed to hold on to the wire-cage and fell down in the lapse of time of 2 minutes, the $ED_{50}$ value in respect of each compound was calculated in accordance with conventional method.

In case rats.—After each compound has been intraperitoneally administered to a group of 5 rats, these rats were made to hold on to the vertical screen separately, and the number of rats that failed to hold on to the vertical screen was measured at every 30 minutes for 6 hours respectively, and based on the points when the peak effect was attained, the dose response was prepared in respect of each compound and the $ED_{50}$ value was calculated in accordance with Lichfield-Wilcoxon method.

TABLE II

| Compound | (A) | (B) | (C) | (D) | (a) | (b) |
|---|---|---|---|---|---|---|
| Mice, $ED_{50}$ (mg./kg.) | 64 | >100 | >100 | 70 | 40.0 | 9.4 |
| Rats, $ED_{50}$ (mg./kg.) | 77 | 75 | 73 | 60 | 36.5 | 8.5 |

(3) Barbiturate-potentiating activity

The experiments were conducted in accordance with the following procedures:

Each compound was intraperitoneally administered to a group of 5 mice. Thirty minutes later, a non-anesthetic dose (40 mg./kg.) of methylhexabital-Na was intraperitoneally administered to each of the mice. The time-duration between the disappearance of the righting reflex and its recovery was measured, and the extension of this time as compared with the case of administration of only methylhexabital-Na was investigated. The dose of the compound required for extending the time by 60 minutes on an average of 5 mice was defined as the $ED_{60\ (min.)}$ value of said compound.

The results are shown in Table III below:

TABLE III

Compound:                 Mice, $ED_{60\ (min.)}$ (mg./kg.)
- A ---- 24.0
- B ---- 27.0
- a ---- 40.0
- b ---- 38.0

(4) Prevention of methamphetamine-induced locomotor activity

Each of the compounds was administered to 3 mice, and 10 minutes later, methamphetamine was intraperitoneally administered to each of the mice in dose of 5 mg./kg. They were coincidentally put into a photocell cage where a light was scanning in a prescribed course. The frequency of light-interception by the mice was electrically recorded over a period of 10 minutes after 15 minutes from the administration of methamphetamine, and the recorded frequency was compared with that in the case of the mice to which had been administered methamphetamine alone. And, the lowering degree of the frequency was defined in terms of prevention (percent) and the $ED_{50}$ value was calculated based on a prevention of 50%.

The results are shown in Table IV below:

TABLE IV

Compound:                 Mice, $ED_{50}$ (mg./kg.)
- A ---- 3.2
- B ---- 6.1
- C ---- 7.5
- a ---- 6.4
- b ---- 7.8

(5) Anti-histamine activity

Experiments were conducted in the following procedures:

Ileum of a male guinea-pig having a body weight of 300–400 g. was isolated and a preparation of the ileum having a length of 1.5–2.0 cm. was made. In accordance with the Magnus method, said preparation was dissolved in 20 ml. of Tyrode's solution maintained at 28° C. to which air had been bubbled, and the movement of the ileum was recorded on a kymographion by using a penwriter. Histamine was added to the solution in dose of 0.05 µg./ml. One minute later after the addition of histamine the rise of the ileum tonus reached its maximum. At that point each compound was added to the solution and examined whether or not the compound exhibits an antagonism to the rise of the ileum. The degree of the antagonism was defined in terms of a ratio (percent) of a relaxation attained by the compound to the ileum shrinkage by histamine. The $ED_{50}$ values given in Table V below correspond to the concentrations of the compounds at which a relaxation of 50% was attained.

TABLE V

Compound:                 $ED_{50}$ (µg./ml.)
- A ---- 0.014
- B ---- 0.015
- a ---- 0.18
- b ---- 0.42

Cataltptic activity, barbiturate potentiating activity and prevention of methamphetamine induced-locomotor activity of the piperazines of this invention such as compound A and B, and 1-(p-fluorobenzoyl)-4-(di- or tri-substituted benzyl) piperazines such as 1-[γ-(p-fluorobenzoyl)-propyl] - 4 - (3 - methyl-4-methoxybenzyl) piperazine (compound A'), 1 - [γ-(p-fluorobenzoyl)-propyl]-4-(3,4,5-trimethoxybenzyl)-piperazine (compound B'), 1-[γ-(p-fluorobenzoyl) - propyl]-4-(2-methoxy-5-methylbenzyl)piperazine (compound C'), 1-[γ-(p-fluorobenzoyl)-propyl]-4-(3-chloro-4-methoxybenzyl)-piperazine (compound D') and 1-[γ-(p-fluorobenzoyl)-propyl]-4-(2-methoxy-5-chlorobenzyl) piperazine (compound E'), were tested in accordance with the above-mentioned experimental procedures 1, 3 and 4 by administrating each of the compounds in dose of 50 mg./kg. The results are shown in Table VI below.

TABLE VI

| Compound | Cataleptic activity (percent) | Barbiturate potentiating activity (minutes) | Prevention of methamphetamine induced-locomotor activity (percent) |
|---|---|---|---|
| A' | *0 | 0 | 68.5 |
| B' | 0 | **18.3 | 43.2 |
| C' | 0 | 28.6 | 75.6 |
| D' | 0 | 0 | 36.3 |
| E' | 0 | 56.5 | 44.8 |
| A | 100 | 88.8 | 99.3 |
| B | 90 | 85.8 | 100.0 |

*The value of 0% means that none of 5 mice in one group exhibit any catalepic activity.
**The value of 18.3 minutes means that an extended period of sleep duration on an average of 5 mice in one group is 18.3 minutes.

As is clear from the results given in Table VI above, in administration intraperitoneally in dose of 50 mg./kg. the piperazines of this invention show an excellent cataleptic activity, as compared with the above-cited 1-[γ- (p - fluorobenzoyl) - propyl] - 4 - (di- or tri-substituted benzyl) piperazines which were not observed to show any cataleptic activity at all. Further, none of the 1-[γ-(p-fluorobenzoyl) - propyl]-4-(di- or tri-substituted benzyl) piperazines exhibited an extension of sleep duration longer than 60 minutes. Still further, it is also understood that the piperazines of this invention have high effects on prevention of methamphetamine-induced activity, as compared with the 1 - [γ-(p-fluorobenzoyl) - propyl]-4- (di- or tri-substituted benzyl) piperazines having very low said effects.

A clinical dosage of the piperazines of this invention depends on disease syndrome, body weight, age and administration method, but it is, in general, in the range of 50–500 mg. per day, preferably in the range of 75–300 mg. per day.

The piperazines of this invention can be prepared for use by dissolving them in a salt form under sterile conditions into water (or an equivalent amount of a non-toxic acid if a free base is used) or in a physiologically compatible aqueous medium such a saline solution, and can be stored in ampoules for injection use. Further, there can be used in a unit dosage form as tablets or capsules for oral administration or optionally in combination with suitable adjuvants such as calcium carbonate, starch, lactose, talc, magnesium stearate and gum acacia. Still further, the piperazines can be formed into aqueous alcohol, glycol or oil solutions or oil-water emulsions for oral administration in the same manner as conventional medical substances are formed.

Methods of preparing 1-aroylpropyl - 4 - aralkyl piperazines of this invention will be explained hereinafter.

(i) The piperazines represented by the formula

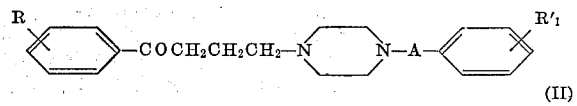

wherein $R'_1$ stands for hydrogen, halogen, nitro, a trihalogenomethyl group, a lower alkyl group having 1 to 4 carbon atoms or a lower alkoxy group having 1 to 4 carbon atoms, a lower alkylthio group having 1 to 4 carbon atoms, and R and A have the same meanings as defined in the Formula I, can be prepared by reacting a Grignard reagent represented by the formula

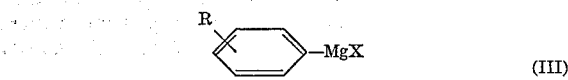

wherein X stands for a bromine or iodine atom and R has the same meaning as defined in the Formula I, with a 1-(γ-cyanopropyl) piperazine represented by the formula

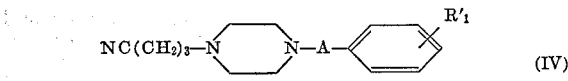

wherein $R'_1$ and A have the same meanings as defined above, and subjecting the resulting reaction product to hydrolysis.

The reaction between the Grignard reagent of the Formula III and the 1-(γ-cyanopropyl) piperazine (IV) is performed by heating the reactants at a temperature of from 10 to 60° C., preferably from 20 to 40° C. over a period of from 1 to 3 hours.

The succeeding hydrolyzing reaction is performed by using a mineral acid such as diluted hydrochloric acid and diluted sulfuric acid at a temperature ranging from 10 to 160° C., preferably from 50 to 80° C., over a period of from 10 minutes to 3 hours, preferably from 10 to 30 minutes.

The starting material represented by the Formula IV can be obtained by condensing γ-bromobutyronitrile with a 1-aralkyl piperazine in an inert solvent such as toluene and xylene in the presence of a basic condensing agent such as triethylamine and potassium carbonate, or by condensing 1-(γ-cyanopropyl) piperazine with an aralkyl halide under similar condensation conditions.

The Grignard reagent represented by the Formula III can be prepared in accordance with the conventional method by adding magnesium into an inert solvent such as ether, dioxane and tetrahydrofuran and adding thereto an arylbromide or aryliodide gradually. In this case, when a reaction promoter such as iodine and methyliodide is added, the reaction proceeds more easily.

(ii) The 1-aroylpropyl-4-aralkyl piperazines represented by the formula

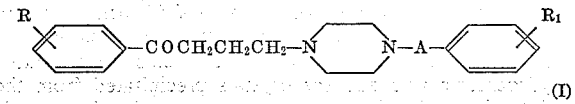

wherein R, $R_1$ and A have the same meanings as defined above, can be prepared by reacting an aroylpropyl halide represented by the formula

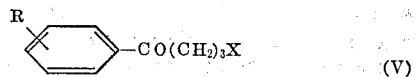

wherein X stands for a halogen atom and R has the same meaning as defined above, with a 1-aralkyl piperazine represented by the formula

wherein A and $R_1$ have the same meanings as defined above, in an inert solvent.

In the reaction between the aroylpropyl halide and aralkyl piperazine it is preferred to use an acid-binding agent such as an inorganic base, e.g. potassium carbonate and sodium carbonate and a tertiary amine, e.g. pyridine and triethyl amine. As the inert solvent to be used in the above reaction there are cited aromatic hydrocarbons such as benzene, toluene and xylene, lower alkanols such as methanol, ethanol and propanol, and lower alkanones such as pentanone, acetone and butanone. Further, it is possible to use the starting material represented by the Formula VI in an excessive amount and use an excessive part thereof as the inert solvent.

The reaction is performed by heating the system at a temperature ranging from 50 to 200° C., preferably from 100 to 140° C. over a period of from 1 to 30 hours, preferably from 3 to 6 hours.

(iii) The 1-aroylpropyl-4-aralkyl piperazines represented by the formula

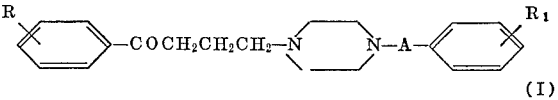

wherein R, $R_1$ and A have the same meanings as defined above, can be obtained by reacting a 1-aroylpropyl piperazine represented by the formula

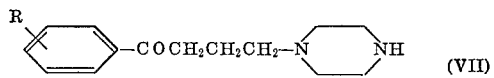

wherein R has the same meaning as defined above, with an aralkyl halide represented by the formula

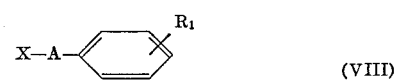

wherein X stands for a halogen atom and $R_1$ and A have the same meanings as defined above, in an inert solvent.

In this reaction it is preferred to use an acid-binding agent such as an inorganic base, e.g. potassium carbonate and sodium carbonate and a tertiary amine, e.g. pyridine and triethylamine.

As the inert solvent there are cited aromatic hydrocarbons such as benzene, toluene and xylene, lower alkanones such as acetone, butanone and pentanone, and lower alkanols such as methanol, ethanol and propanol.

The reaction is performed by heating the system at a temperature ranging from 50 to 200° C., preferably from 80 to 110° C. over a period of from 1 to 20 hours, preferably from 1 to 3 hours.

(iv) The 1-aroylpropyl-4-aralkyl piperazines represented by the formula

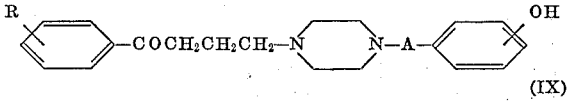

wherein R and A have the same meanings as defined above, can be prepared by heating a 1-aroylpropyl-4-aralkyl piperazine represented by the formula

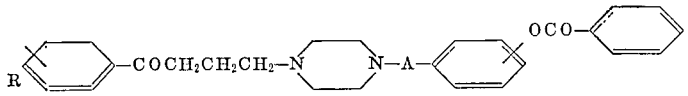

wherein R and A have the same meanings as defined above, in the presence of a strong base such as sodium hydroxide and potassium hydroxide or a mineral acid such as diluted hydrochloric acid and diluted sulfuric acid at a temperature ranging from 30 to 120° C., preferably from 50 to 80° C. over a period of from 10 minutes to 2 hours, preferably from 30 minutes to one hour.

In each of the above-mentioned processes, the 1-aroylpropyl-4-aralkyl piperazines are obtained in a form of a free base or a salt according to the reaction procedure. The salt is converted to a free base in accordance with the conventional method, for instance, by treating the salt with an alkaline agent such as an alkali metal hydroxide or an ion-exchange resin. On the other hand, the free base can be converted to a pharmaceutically acceptable non-toxic salt in accordance with the conventional method by treating the free base with an inorganic or organic acid such as hydrochloric acid, phosphoric acid, sulfuric acid, citric acid, lactic acid, maleic acid, malic acid, tartaric acid, acetic acid and benzoic acid. Further, it is also possible to exchange the salt of the 1-aroylpropyl-4-aralkyl piperazine with a salt of another acid. Still further, it is also possible, if required, to convert the free base into a salt of a quaternary ammonium salt with methyl chloride or bromide, ethyl chloride or bromide, benzyl chloride or bromide, phenethyl chloride or bromide, or allyl chloride or bromide.

The following detailed examples are provided to illustrate this invention but not to limit the scope thereof.

EXAMPLE

1-[γ-(p-fluorobenzoyl)propyl]-4-(p-methoxybenzyl) piperazine hydrochloride

Process (i).—A solution of 2 g. of p-bromofluorobenzene in 20 ml. of anhydrous ether is added stepwise to a mixture of 0.3 g. of magnesium and 15 ml. of anhydrous ether with stirring. Several drops of methyl iodide are added to the reaction mixture, and at the same time the reaction begins. After one hour's agitation at room temperature, to the reaction mixture is gradually added a solution of 2.7 g. of 1-(γ-cyanopropyl)-4-(p-methoxybenzyl) piperazine in anhydrous ether, and thereafter the mixture is refluxed for 2 hours. To the resulting solution, diluted hydrochloric acid is gradually added to extract a diluted hydrochloric acid layer. A solution of the extracted layer is heated on a water bath for one hour and cooled to precipitate crystals. The precipitated crystals are separated by filtration and recrystallized from ethanol to obtain 1.9 g. of the intended compound having a melting point of 245–247° C. (decomposition).

Process (ii).—A mxture of 1.9 g. of 1-(p-methoxybenzyl) piperazine, 2.2 g. of γ-(p-fluorobenzoyl) propyl chloride and 1.2 g. of triethylamine in 30 ml of xylene is heated under reflux for 12 hours. The reaction mixture is cooled and thereafter, the precipitated crystals are filtered and to the filtrate is added concentrated hydrochloric acid to precipitate crystals. The crystals are separated and recrystallized from ethanol to obtain the intended compound.

Process (iii).—A mixture of 3.7 g. of 1-[γ-(p-fluorobenzoyl) propyl] piperazine, 2.3 g. of p-methoxybenzyl chloride and 1.65 g. of triethylamine in 30 ml. of toluene is heated under reflux for 4 hours. The mixture is cooled and thereafter the precipitated crystals are filtered. To the filtrate, concentrated hydrochloric acid is added to precipitate crystals. The so formed crystals are separated and recrystallized from ethanol to obtain 4.2 g. of the intended compound.

The following compounds can be obtained in accordance with the above-mentioned processes (i), (ii) and (iii) of Example 1:

1-[γ-(p-methoxybenzoyl) propyl]-4-(o-chlorobenzyl)-piperazine hydrochloride (melting point: 242–243° C.);

1 - [γ - (p-fluorobenzoyl) propyl]-4-(m-chlorobenzyl)-piperazine hydrochloride (melting point: 250–252° C.);

1 - [γ - (p-fluorobenzoyl) propyl]-4-(p-chlorobenzyl)-piperazine hydrochloride (melting point: 255–257° C.);

1-[γ-(p-fluorobenzoyl) propyl]-4-(m-methoxybenzyl)-piperazine hydrochloride (melting point: 227–229° C.);

1 - [γ-(p-fluorobenzoyl) propyl]-4-(o-methoxybenzyl)-piperazine hydrochloride (melting point: 240–241° C.);

1 - [γ - (p-fluorobenzoyl) propyl]-4-(p-methylbenzyl)-piperazine hydrochloride (melting point: 253–255° C.);

1 - [γ - (p-fluorobenzoyl) propyl]-4-benzyl piperazine hydrochloride (melting point: 243–247° C.) (decomposition);

1 - [γ - (p-fluorobenzoyl) propyl]-4-phenethyl piperazine hydrochloride (melting point: 250–252° C.); and 1 - [γ - (p-fluorobenzoyl) propyl]-4-(γ-phenylpropyl) piperazine hydrochloride (melting point: 250–253° C.).

EXAMPLE 2

1 - [γ-(p-fluorobenzoyl) propyl]-4-(p-methoxybenzyl)-piperazine oxalate:

1 - [γ - (p-fluorobenzoyl) propyl]-4-(p-methoxybenzyl)-piperazine (1.5 g.) is dissolved in 10 ml. of ethanol, and 1.2 g. of oxalic acid is added to the solution at room temperature. The precipitated crystals are separated and recrystallized from methanol to obtain 1.5 g. of the intended compound having a melting point of 220.5° C. (decomposition).

EXAMPLE 3

1-[γ-(p-fluorobenzoyl) propyl)]-4-(p-methoxybenzyl)-piperazine citrate:

1 - [γ-(p-fluorobenzoyl) propyl]-4-(p-methoxybenzyl)-piperazine (3.5 g.) is dissolved in 20 ml. of acetone and 2.2 g. of citric acid is added to the solution at room temperature. The precipitated crystals are separated and recrystallized from isopropyl alcohol to obtain 5.1 g. of the intended compound having a melting point of 79–80° C.

EXAMPLE 4

1-[γ-(p-methoxybenzoyl) propyl]-4-(p-methoxybenzyl)-piperazine hydrochloride:

Process (i).—A solution of 2.3 g. of p-methoxybromobenzene in 30 ml. of ether is gradually added with agitation to a mixture of 0.32 g. of magnesium and 30 ml. of ether. The reaction mixture is agitated at room temperature for one hour and thereafter, a solution of 3 g. of 1-(γ-cyanopropyl)-4-(p-methoxybenzyl) piperazine in 30 ml. of ether is added gradually to the above reaction mixture at a rate sufficient to maintain the reflux. After the addition, the resulting solution is heated for 2 hours under reflux and cooled, and thereafter diluted hydrochloric acid is added thereto. The diluted hydrochloric acid layer is separated, heated for one hour on a water bath, and thereafter cooled. The resulting solution is made alkaline by adding sodium hydroxide thereto and extracted with ether. The ether layer is dried with potassium carbonate, and thereafter the ether is distilled off to obtain an oily product. Alcoholic hydrochloric acid is added to the oily product to form its salt of hydrochloric acid. The salt is recrystallized to obtain 1.3 g. of the intended compound having a melting point of 244–245° C.

Process (ii).—A mixture of 3.5 g. of γ-(p-methoxybenzoyl)-propylchloride, 3.5 g. of 1-(p-methoxybenzyl) piperazine and 1.9 g. of triethylamine in 50 ml. of toluene is heated for 7 hours under reflux. The resulting solution is cooled and the precipitated crystals are separated by filtration. The toluene layer is extracted with diluted hydrochloric acid and the crystals precipitated from the diluted hydrochloric acid layer are separated and recrystallized from alcohol to obtain 3.2 g. of the intended compound having a melting point of 244–245° C.

Process (iii).—A mixture of 3 g. of 1-[γ-(p-methoxybenzoyl) propyl]-piperazine, 1.8 g. of p-methoxybenzylchloride and 1.2 g. of triethylamine in 30 ml. of toluene is heated for 4 hours under reflux. After the reaction mixture is cooled, the precipitated crystals are separated and the filtrate is extracted with diluted hydrochloric acid. The diluted hydrochloric acid layer is made alkaline with sodium hydroxide and extracted with chloroform. The extracted liquor is dried with potassium carbonate, and thereafter the chloroform is removed therefrom to obtain an oily product. When alcoholic hydrochloric acid is added to the oily product, its salt to hydrochloric acid is formed. The salt is recrystallized from alcohol to obtain the intended compound in a yield of 1.9 g.

EXAMPLE 5

1 - (γ - benzoylpropyl)-4-(p-methoxybenzyl) piperazine hydrochloride:

Process (i).—A solution of 2.5 g. of bromobenzene in 30 ml. of ether is gradually added to a mixture of 0.43 g. of magnesium and 50 ml. of ether at a rate sufficient to maintain the reflux. After the addition, the resulting solution is agitated at room temperature for one hour, and thereafter, to the solution, a solution of 4 g. of 1-(γ-cyanopropyl)-4-(p-methoxybenzyl) piperazine in 30 ml. of ether is added gradually at a rate sufficient to maintain the reflux. Thereafter, the resulting mixture is heated for 2 hours under reflux, and then, diluted hydrochloric acid is added thereto gradually. The diluted hydrochloric acid layer is separated, heated for one hour on a water bath, and thereafter cooled to precipitate crystals. The crystals are separated and recrystallized from alcohol to obtain 3.5 g. of the intended compound having a melting point of 263–264° C. (decomposition).

Process (ii).—A mixture of 1.9 g. of 1-(p-methoxybenzyl) piperazine, 1.9 g. of γ-benzoylpropyl chloride and 1.2 g. of triethylamine in 25 ml. of xylene is heated under reflux for 12 hours. After the reaction mixture is cooled, the precipitated crystals are separated and the filtrate is extracted with diluted hydrochloric acid. The diluted hydrochloric acid layer is made alkaline with sodium hydroxide and extracted with chloroform. The chloroform solution is dried with potassium carbonate and thereafter the chloroform is distilled off. When alcoholic hydrochloric acid is added to the residue of an oily substance, its salt of hydrochloric acid is formed. The salt is recrystallized from diluted ethanol to obtain 1.1 g. of the intended compound.

EXAMPLE 6

1 - [γ - (p-fluorobenzoyl)-propyl]-4-(p-fluorobenzyl)-piperazine hydrochloride:

A mixture of 2.5 g. of 1-[γ-(p-fluorobenzyl) propyl] piperazine, 1.5 g. of p-fluorobenzylchloride and 1 g. of triethylamine is heated under reflux for 3 hours. The resulting solution is cooled and the precipitated crystals are filtered. Thereafter, the toluene layer is extracted with diluted hydrochloric acid. The diluted hydrochloric acid layer is made alkaline by adding sodium hydroxide thereto, and then is extracted with chloroform. The cholorform solution is dried with anhydrous sodium sulfate and thereafter, the chloroform is distilled off. To the residue is added alcoholic hydrochloric acid to form a salt of hydrochloric acid. The resulting salt is recrystallized from alcohol to obtain 2 g. of the intended compound having a melting point of 255–257° C.

EXAMPLE 7

1 - [γ - (p-fluorobenzoyl) propyl]-4-(p-bromobenzyl)-piperazine hydrochloride:

A mixture of 3.8 g. of 1-(p-bromobenzyl) piperazine, 3.2 g. of γ-(p-fluorobenzoyl) propyl chloride and 1.7 g. of triethylamine in 30 ml. of xylene is heated under reflux for 10 hours. The resulting solution is cooled and the precipitated crystals are filtered. The filtrate is extracted with diluted hydrochloric acid, and the diluted hydrochloric acid layer is made alkaline with sodium hydroxide and extracted with chloroform. The chloroform solution is dried with potassium carbonate and thereafter the chloroform is distilled off. To the residue of an oily substance is added alcoholic hydrochloric acid to form a salt of hydrochloric acid. The salt is recrystallized from ethanol to obtain 1.8 g. of the intended compound having a melting point of 248–250° C. (decomposition).

EXAMPLE 8

1 - [γ - (p - fluorobenzoyl) propyl] - 4 - (p-methoxyphenethyl) piperazine hydrochloride:

A mixture of 6 g. of 1-[γ-(p-fluorobenzyl) propyl]-piperazine, 6 g. of p-methoxyphenethyl bromide and 3 g. of triethylamine in 30 ml. of toluene is heated under a reflux for 8 hours. The resulting solution is cooled and the precipitated crystals are filtered. The filtrate is extracted with diluted hydrochloric acid and the diluted hydrochloric acid layer is made alkaline with sodium hydroxide, extracted with chloroform and thereafter dried with potassium carbonate, following which the chloroform is distilled off. To the residue of an oily substance is added alcoholic hydrochloric acid to form a salt of hydrochloric acid. The salt is recrystallized from ethanol to obtain 2.5 g. of the intended compound having a melting point of 260–261° C. (decomposition).

EXAMPLE 9

1 - [γ - (p - fluorobenzoyl)-propyl]-4-[γ - (p - methoxyphenyl)-propyl] piperazine hydrochloride:

A mixture of 3 g. of 1-[γ-(p-fluorobenzoyl) propyl]-piperazine, 2.75 g. of p-methoxyphenylpropylbromide and 1.4 g. of triethylamine in 40 ml. of xylene is heated under reflux for 5 hours. The resulting solution is cooled and the precipitated crystals are filtered. The filtrate is extracted with diluted hydrochloric acid the diluted hydrochloric acid layer is made alkaline with sodium hydroxide and extracted with chloroform. The chloroform solution is dried with potassium carbonate and thereafter the chloroform is distilled off. To the residue of an oily substance is added alcoholic hydrochloric acid to form a salt of hydrochloric acid. The salt is recrystallized from ethanol to obtain 1.4 g. of the intended compound having a melting point of 230–234° C.

EXAMPLE 10

1-[γ-(p - fluorobenzoyl) propyl]-4-(p-trifluoromethylbenzyl) piperazine hydrochloride:

A mixture of 2.3 g. of 1-(p-trifluoromethylbenzyl)-piperazine, 2.2 g. of γ-(p-fluorobenzoyl) propylchloride and 1.2 g. of triethylamine in 30 ml. of xylene is heated under reflux for 12 hours. The resulting solution is cooled and the precipitated crystals are separated by filtration. The filtrate is extracted with diluted hydrochloride acid, and the diluted hydrochloric acid layer is made alkaline and extracted with chloroform. The chloroform solution is dried with potassium carbonate and the chloroform is distilled off. To the residue of an oily substance alcoholic hydrochloric acid is added to form a salt of hydrochloric acid. The salt is recrystallized from ethanol to obtain 1.1 g. of the intended compound having a melting point of 235–236° C.

EXAMPLE 11

1-[γ-(p-fluorobenzoyl) propyl]-4-(p-methylthiobenzyl) piperazine hydrochloride:

A mixture of 3 g. of 1-[γ-(p-fluorobenzoyl) propyl]-piperazine, 2.7 g. of p-methylthiobenzylchloride and 1.33 g. triethylamine in 30 ml. of toluene is heated under reflux for 2 hours. The resulting solution is cooled and the precipitated crystals are filtered. The filtrate is extracted with diluted hydrochloric acid, and the diluted hydrochloric acid layer is made alkaline with sodium hydrochloride and extracted with chloroform. The chloroform solution is dried with potassium carbonate and the chloroform is distilled off to form a yellow, oily substance which is a base of the intended compound. When alcoholic hydrochloric acid is added to the yellow, oily substance, there is formed a hydrochloric acid salt of the intended compound. The salt is recrystallized from alcohol to obtain 1.4 g. of the intended compound having a melting point of 229–231° C.

EXAMPLE 12

1 - [γ-(p-fluorobenzoyl) propyl]-4-(p-benzoyloxybenzyl) piperazine hydrochoride:

A mixture of 3 g. of 1-[γ-(p-fluorobenzoyl) propyl]-piperazine, 3.34 g. of p-benzoyloxybenzylbromide and 1.3 g. of triethylamine in 30 ml. of toluene is heated under reflux for 2 hours. The resulting solution is cooled and the precipitated crystals are filtered. The filtrate is extracted with diluted hydrochloric acid. The hydrochloric acid layer is made alkaline with sodium hydroxide and extracted with chloroform. The chloroform solution is dried with sodium carbonate and thereafter the chloroform is distilled off to form a yellow, oily substance which is a base of the intended compound. The yellow, oily substance is converted to a hydrochloric acid salt by adding hydrochloric acid thereto. The salt is recrystallized from alcohol to obtain 1.5 g. of the intended compound having a melting point of 227–229° C.

EXAMPLE 13

1-[γ-(p-fluorobenzoyl) propyl]-4-(p-hydroxybenzyl)-piperazine hydrochloride:

1-[γ-(p-fluorobenzoyl) propyl]-4-(p-benzoyloxybenzyl) piperazine (2.3 g.) is dissolved into a mixture of 2 ml. of water and 80 ml. of ethanol. After addition of 0.3 g. of potassium hydroxide, the solution is heated under reflux on a water bath for one hour. The ethanol is distilled off under reduced pressure. To the remaining liquid is added water, and the liquid is neutralized with acetic acid and then extracted with chloroform. The chloroform solution is dried with anhydrous sodium sulfate, and the chloroform is distilled off. To the residue there is added alcoholic hydrochloric acid to form a hydrochloric acid salt. The salt is recrystallized from ethanol to obtain 1.2 g. of the intended compound having a melting point of 226–228° C.

EXAMPLE 14

1 - [γ - (p-fluorobenzoyl) propyl]-4-(p-acetylbenzyl)-piperazine hydrochloride:

A mixture of 3 g. of 1-[γ-(p-fluorobenzoyl) propyl] piperazine, 2.1 g. of p-acetylbenzylchloride and 1.3 g. of triethylamine in 40 ml. of toluene is heated under reflux for 3 hours. The resulting solution is cooled and the precipitated crystals are filtered. The filtrate is extracted with diluted hydrochloric acid. The diluted hydrochloric acid layer is made alkaline and extracted with chloroform. The chloroform solution is dried with potassium carbonate, and thereafter the chloroform is distilled off. To the residue is added to form a hydrochloric acid salt. The salt is recrystallized from methanol to obtain 2.4 g. of the intended compound having melting points of 234–236° C.

EXAMPLE 15

1-[γ-(p-fluorobenzoyl) propyl]-4-(p-nitrobenzyl)-piperazine hydrochloride:

A mixture of 1.25 g. of 1-[γ-(p-fluorobenzoyl) propyl]-piperazine, 1.1 g. of p-nitrobenzylbromide and 0.6 g. of triethylamine in 30 ml. of toluene is heated under reflux for 3 hours. The resulting solution is cooled and the precipitated crystals are filtered. The filtrate is extracted with diluted hydrochloric acid. The diluted hydrochloric acid layer is made alkaline and extracted with chloroform. The chloroform solution is dried with potassium carbonate, and the chloroform is distilled off. To the oily residue is added alcoholic hydrochloric acid to from a hydrochloric acid salt. The salt is recrystal-lized from methanol to obtain 0.8 g. of the intended compound having a melting point of 255–257° C.

EXAMPLE 16

1-[γ-(p-fluorobenzoyl) propyl]-4-(α-methylphenethyl) piperazine hydrochloride:

A mixture of 3 g. of 1-[γ-(p-fluorobenzoyl) propyl]-piperazine, 2.4 g. of α-methylphenethyl bromide and 1.3 g. of triethylamine in 30 ml. of xylene is heated under reflux for 8 hours. The resulting solution is cooled and the precipitated crystals are filtered. The filtrate is extracted with diluted hydrochloric acid, and the diluted hydrochloric acid layer is made alkaline and extracted with ether. The ether layer is dried with potassium carbonate and thereafter the ether is distilled off. The residue is subjected to chromatography with basic alumina. The portion effluent with ether is collected, and the ether is distilled off. To the residue is added alcoholic hydrochloric acid to form a hydrochloric acid salt. The salt is recrystallized from a mixed liquid of methanol and ethanol to obtain 0.9 g. of the intended compound having a melting point of 259–262° C.

EXAMPLE 17

1-[γ-(p-fluorobenzoyl) propyl]-4 - (α-phenyl-p-chlorobenzyl)piperazine hydrochloride:

A mixture of 7 g. of 1-[γ-(p-fluorobenzoyl) propyl] piperazine, 7 g. of α-phenyl-p-chlorobenzylchloride and 3 g. of triethylamine in 30 ml. of toluene is heated under reflux for 4 hours. The resulting solution is treated in the same manner as in Example 16. The portion which is primarily effluent in chromatography with ether is collected, and the ether is distilled off to obtain the colorless, oily intended compound.

The elementary analysis values of the obtained compound ($C_{27}H_{28}ON_2ClF$) are as follows:

Calculated values: C=71.91, H=6.26, N=6.21, Cl=7.86 and F=4.21.

Measured values: C=71.65, H=6.42, N=5.98, Cl=8.14 and F=3.89.

EXAMPLE 18

|  | G. |
|---|---|
| 1-[γ-(p-fluorobenzoyl)-propyl]-4-(p-methoxybenzyl)-piperazine | 25 |
| Lactose | 45 |
| Starch | 9.5 |
| Microcrystalline cellulose | 20 |
| Magnesium stearate | 0.5 |

The above materials are mixed together, granulated and tabletted in accordance with the conventional method to give 1000 tablets, each of which weighs 100 mg.

What we claim is:

1. 1-aroylpropyl-4-aralkyl piperazines and pharmaceutically acceptable non-toxic disalts thereof of the formula

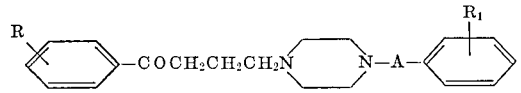

wherein R is hydrogen, halogen or a lower alkoxy group having 1 to 4 carbon atoms, $R_1$ is hydrogen, halogen, nitro, alkoxy group having 1 to 4 carbon atoms, and A is a lower group having 2 to 5 carbon atoms, a benzoyloxy group, a lower alkyl group having 1 to 4 carbon atoms, a lower alkylthio group having 1 to 4 carbon atoms or a lower alkoxy group having 1 to 4 carbon atoms, and A is a lower alkylene group having 1 to 5 carbon atoms which may be substituted by a lower alkyl group having 1 to 4 carbon atoms or a phenyl group.

2. The 1-aroylpropyl-4-aralkyl piperazines according to claim 1, having the formula

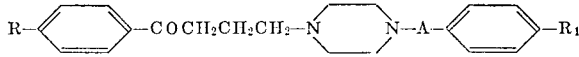

wherein R, A and $R_1$ have the same meanings as defined in claim 1.

3. 1-[γ-(p - fluorobenzoyl)-propyl]-4-(methoxybenzyl) piperazine.

4. 1-[γ-(p - fluorobenzoyl)-propyl]-4-(p-fluorobenzyl) piperazine.

5. 1-[γ-(p - fluorobenzoyl)-propyl]-4-(p-methylbenzyl) piperazine.

6. 1-[γ-(p - fluorobenzoyl)-propyl]-4-(p - methylthiobenzyl) piperazine.

7. 1-[γ-(p - fluorobenzoyl)-propyl]-4-(m - chlorobenzyl) piperazine.

8. A pharmaceutically acceptable non-toxic disalt of the piperazine of claim 3.

9. A pharmaceutically acceptable non-toxic disalt of the piperazine of claim 4.

10. A pharmaceutically acceptable non-toxic disalt of the piperazine of claim 5.

11. A pharmaceutically acceptable non-toxic disalt of the piperazine of claim 6.

12. A pharmaceutically acceptable non-toxic disalt of the piperazine of claim 7.

13. The 1-aroylpropyl-4-aralkyl piperazines of claim 1 wherein the pharmaceutically acceptable non-toxic disalt is a disalt of hydrochloric acid or citric acid.

14. The 1-aroylpropyl-4-aralkyl piperazines of claim 2 wherein the pharmaceutically acceptable non-toxic disalt is a disalt of hydrochloric acid or citric acid.

References Cited

UNITED STATES PATENTS

| | | | |
|---|---|---|---|
| 3,562,277 | 2/1971 | Hansen | 260—268 |
| 2,997,472 | 8/1961 | Janssen | 260—268 |
| 3,000,892 | 9/1961 | Janssen | 260—268 |
| 3,180,867 | 4/1965 | Shapiro et al. | 260—268 |
| 3,446,808 | 5/1969 | Cyba | 260—268 X |
| 3,505,334 | 4/1970 | Regnier | 260—268 |
| 3,523,120 | 8/1970 | Beregi | 260—268 |

FOREIGN PATENTS

| | | | |
|---|---|---|---|
| 971,041 | 9/1964 | Great Britain | 260—268 |

DONALD G. DAUS, Primary Examiner

U.S. Cl. X.R.

260—268 PH, 268 CN, 268 BZ, 645, 649 F; 424—250